Patented Oct. 12, 1948

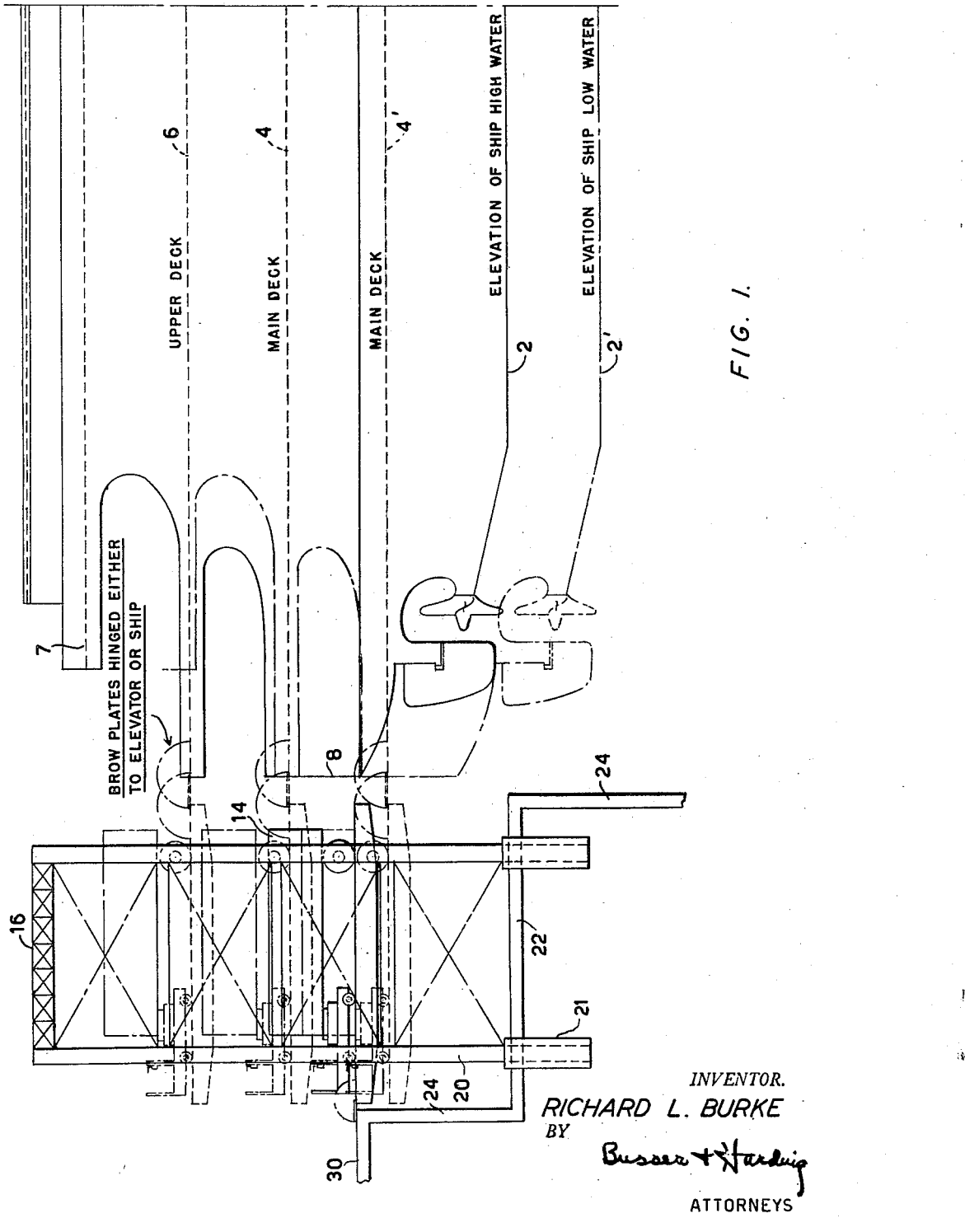

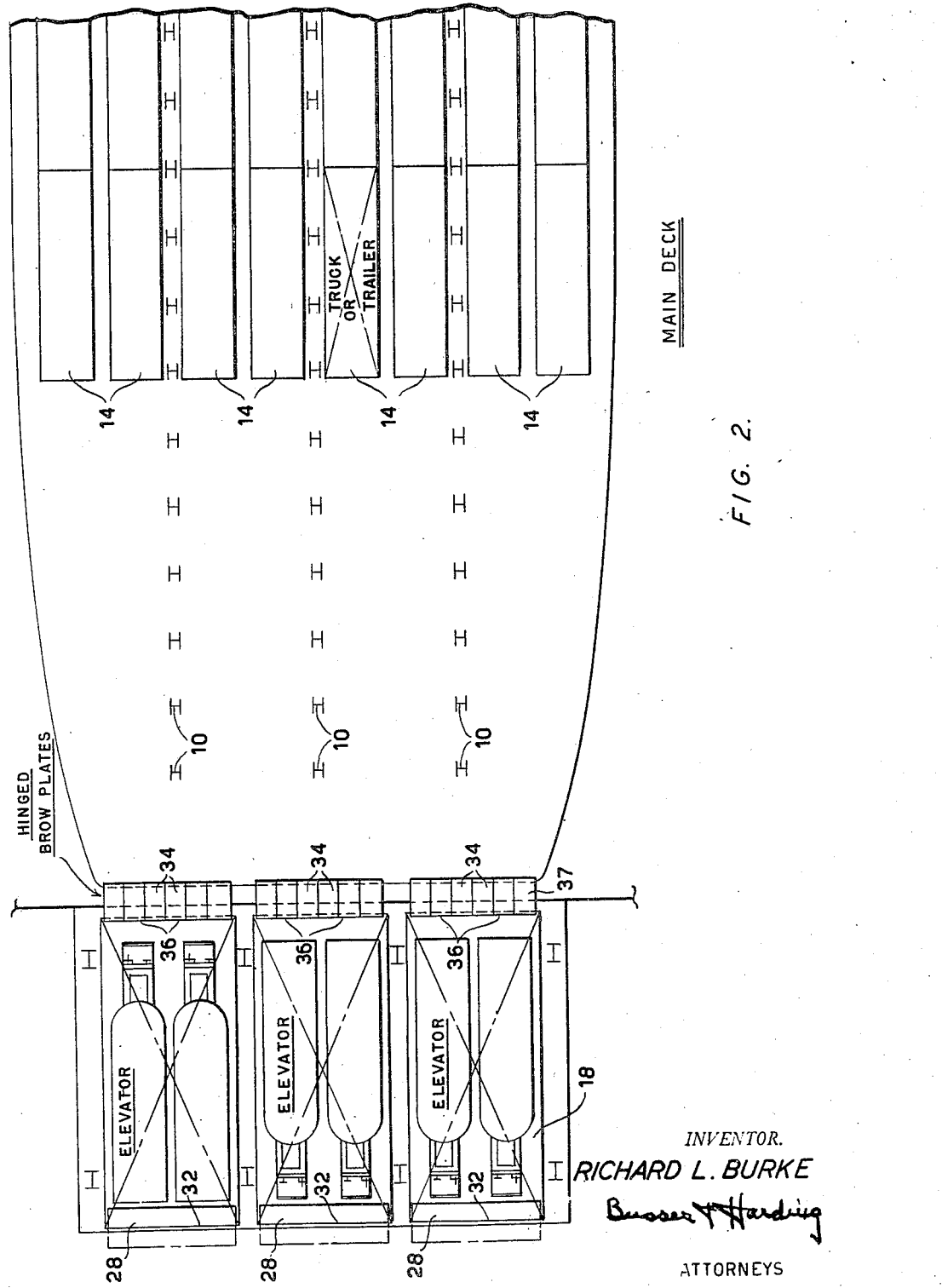

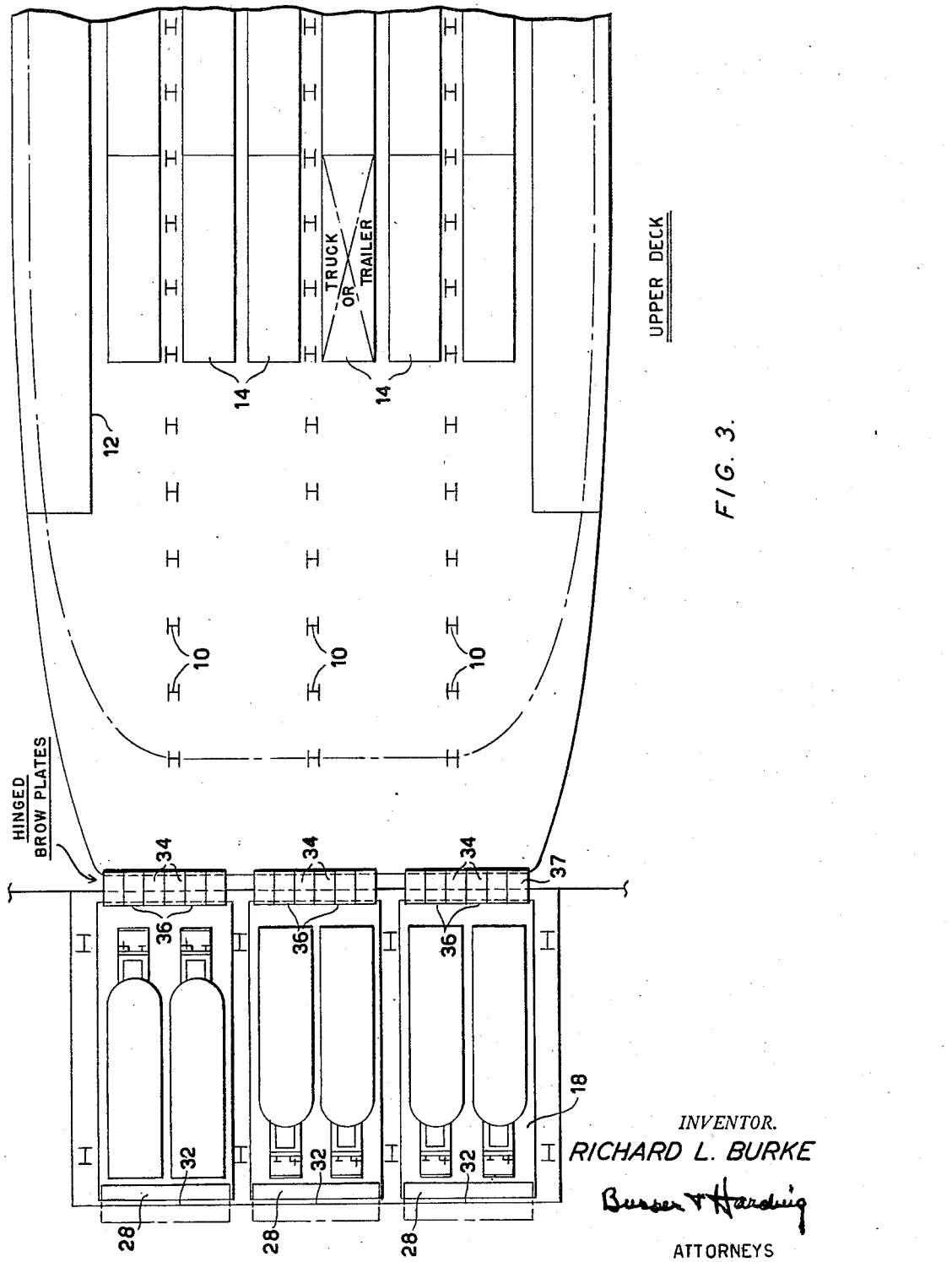

2,451,198

UNITED STATES PATENT OFFICE 2,451,198

MEANS FOR LOADING SHIPS

Richard L. Burke, Swarthmore, Pa., assignor to Sun Shipbuilding & Dry Dock Company, Chester, Pa., a corporation of Pennsylvania Application February 7, 1947, Serial No. 727,135

5 Claims. (Cl. 214—14)

This invention relates to a vehicle carrying ship and means for loading such a ship. It is directed more particularly to a ship capable of carrying truck trailers, trucks and trailers, and automobiles and means for loading such a ship.

The low cost of transportation by water is well recognized. This form of transportation, however, is greatly handicapped by the time required to load and unload. Therefore, where time is an important factor in the shipment of goods, it has previously been impractical to take advantage of water transportation.

Due to the fact that they provide door to door service and thus require a minimum of cargo handling, large capacity trucks and trailer trucks are widely used for transporting goods over long distances where rapidity of service is desired. The cost of this method of transportation is very high in comparison with the cost of water transportation.

It is an object of this invention to provide a ship which can be loaded and unloaded rapidly with cargo carrying vehicles and transport such vehicles between selected coastal points.

In the event that truck trailers are carried without their tractor units, great savings can be realized with no sacrifice in promptness of delivery. The number of tractor units required to operate a given number of trailers will be reduced. Savings in labor cost, decreases in the wear and tear on the required operating equipment and a considerable reduction in the specific cost of moving a trailer load of cargo over a long distance will be realized by trucking concerns. Similarly, if the tractor units are transported with the trailer or if a non-trailer type truck is carried, almost as great savings can be realized.

It is a further object of this invention to provide a rapid means of loading and unloading a ship with vehicles which can be operated irrespective of the condition of the tide and list of the ship.

These and other objects of the invention will become apparent from the following description, read in conjunction with the accompanying drawing, in which:

Fig. 1 is a diagrammatic view in side elevation of a ship, broken away, in combination with loading means;

Fig. 2 is a diagrammatic plan view of Fig. 1 showing the main deck of the ship; and Fig. 3 is a diagrammatic plan view of Fig. 1 showing the upper deck of the ship.

In the drawings a vehicle carrying ship is shown as having a keel 2, a main deck 4, an upper deck 6, a superstructure deck 7 and a transom stern 8. The main deck 4 and the upper deck 6 extend towards the stern of the ship as far as a vertical plane through the face of the transom stern and have a width at the stern of slightly less than the beam of the ship.

Fig. 1 also shows the ship in a low water elevation with the keel shown at 2', the main deck at 4'.

Between the upper deck 6 and the superstructure deck 7 the deck supporting structural members 10 are located so as to form a plurality of parallel vehicle lanes on the upper deck extending fore and aft of the ship, the two inboard lanes being double lanes capable of accommodating two vehicles 14 side by side at any point while the outboard lanes next to the bulkheads 12 are single lanes.

Similarly between the main deck 4 and the upper deck 6 the structural members 10 are located so that the main deck has a plurality of parallel lanes extending fore and aft of the ship, all of which are double lanes and can accommodate two vehicles side by side at any point.

The ship preferably is capable of maintaining a high speed, a cruising speed of 20 to 30 knots being preferred. To economically achieve such high speed, a narrow beam in relation to the length of the ship is desirable. A beam of approximately 82 feet and a waterline length of about 530 feet is preferred although it will be apparent that the relation of beam to length may vary considerably depending on the objectives of the ship's design.

The ship is moored so as to be perpendicular to the shore with its stern in close proximity to the bulkhead 24. The mooring may be accomplished in a well known manner, such as, for example, by securing lines to a pier or to dolphins.

In order to load and unload the ship, a bank of elevators comprising the elevators 16, each capable of carrying two vehicles side by side on an elevator platform 18, are located so that each lane of the moored ship may be loaded or unloaded by moving vehicles in a substantially straight line and so that the elevator platforms 18 extend to a point in close proximity to a vertical plane adjacent the stern ends of the main deck 4 and the upper deck 6.

The elevators may be actuated by a well known mechanism suitable for handling heavy loads of the order of loaded trucks and trailers. The main supports 20 of the elevators are mounted in concrete piles 21 or on concrete footings, which extend downward from step 22 in the bulkhead 24.

Extending approximately the full width of the platforms 18 are brow plates 28 which bridge the gap between the dock 30 and the platforms 18 while moving vehicles between the dock and the platforms. These plates are preferably made of medium gauge steel and are hinged to the platform 18 at 32, so that they may be stowed on the platforms 18 when not in use.

One end of brow plates 34 is hinged to the ship side of the platforms 18 at 36. Each platform has six brow plates 34 which are individually hinged and form a brow 37. The other end of the plates 34 rests on the deck which is being loaded or unloaded. When not bridging the gap between the platforms and a deck, the brow plates are swung to a position flat on the platforms.

A chain, or other flexible means, may be secured to the under side of these plates to permit the plates of each platform to be swung as a unit and yet permit each plate to move independently when resting on a deck of the ship.

The brow plates 34 not only serve to bridge the varying gap between the platforms 18 and the ship and compensate for vertical motion of the ship, but also compensate for any list the ship may have. Consider, for example, that the ship has a list to port so that when the end elevator opposite the port outboard lane is positioned with its platform 18 level with the main deck opposite the side of the platform nearest the center line of the ship, the main deck opposite the other side of the platform is six inches below the platform.

Since in this illustration the brow comprises six brow plates, each brow plate covers approximately one sixth of the total width of the elevator platform. Consequently, the deck opposite the outboard side of each brow plate will be approximately one sixth of the six inch drop of the deck opposite the elevator platform or one inch lower than the deck opposite the inboard side of the brow plate. The flexibility of the brow plates permits them to bend sufficiently so that despite the list of the deck their ship side ends will bear at all points on the deck when they are subjected to a load.

Thus the formation of a brow by using a plurality of independently hinged plates compensates the brow for the list of the ship by permitting each plate to drop to the level of the high point of the deck opposite the plate and by having each plate covering a small enough increment of the width of the elevator platform so that the flexibility of the plate will permit it to bend sufficiently to bear at all points on the listed surface of the deck.

If a one piece brow plate similar to the brow plates 28 were used for the ship side of the elevator platform under similar conditions of list, it is apparent that only a relatively small portion of the inboard end of the brow would be able to bear on the deck while loading or unloading the vehicles. The plate could not possibly have the requisite strength and still bend enough to compensate for the list. Thus, if the ship were not on a perfectly even keel, loading and unloading would have to cease until she was placed in such a condition. Since it is an impossibility to maintain a ship on an even keel while loading and unloading cargo, loading means which require such a condition of trim are obviously impractical.

It will be apparent that the elevator 16 provides for loading a vehicle 14 under all normally encountered conditions. Thus, if the main deck 4 is below the level of the dock 30 as shown at 4', the elevator platforms may be brought into coincidence with it at this level. Variations of tide have no effect on the efficiency of loading. Further, any list of the ship is compensated for by the brow plates 26 so that all of the three elevator platforms may be unloaded irrespective of list.

It will be apparent that numerous modifications may be made to the structure within the scope of this invention. Thus, for example, the depth of the step 22 from the dock may be varied according to the range of the tide where it is located. The brow plates 34 may be hinged to the deck of the ship instead of to the elevator platforms. Similarly the brow plates 28 may be hinged to the dock instead of to the platforms 18.

I claim:

1. In combination a moored ship having a vehicle-deck provided with a plurality of vehicle lanes which extend from the stern of the ship and which are approximately parallel to the centerline of the ship, and a bank of elevators at a shore loading point, said elevators comprising platforms and a plurality of brow plates individually hinged to the ship side of each platform affording a plurality of separate relatively narrow surfaces connecting each platform to said deck of the ship at the stern.

2. In combination a moored ship having a vehicle deck provided with a plurality of vehicle lanes which extend from the stern of the ship and which are approximately parallel to the centerline of the ship, and a bank of elevators at a shore loading point, said elevators comprising platforms, a plurality of brow plates individually hinged to the ship side of each platform affording a plurality of separate relatively narrow surfaces connecting each platform to said deck of the ship at the stern, and a brow plate hinged to the shore loading point side of each platform affording a surface connecting each platform and the shore loading point.

3. In combination a moored ship having a vehicle deck provided with a plurality of vehicle lanes which extend from the stern of the ship and which are approximately parallel to the centerline of the ship, a bank of elevators at a shore loading point, said elevators comprising platforms extending to a point in close proximity to a vertical plane through the stern end of the vehicle deck and capable of being elevated or lowered above and below the level of the shore loading point to a position opposite said deck and a plurality of brow plates individually hinged to the ship side of each platform affording a plurality of separate relatively narrow surfaces connecting the platform and said deck of the ship at the stern.

4. In combination a moored ship having a vehicle deck provided with a plurality of vehicle lanes which extend from the stern of the ship and which are approximately parallel to the centerline of the ship, a bank of elevators at a shore loading point, said elevators comprising platforms extending to a point in close proximity to a vertical plane through the stern end of the vehicle deck and capable of being elevated or lowered above and below the level of the shore loading point to a position opposite said deck, a plurality of brow plates individually hinged to the ship side of each platform affording a plurality of separate relatively narrow surfaces connecting the platform and said deck of the ship at the stern and a brow plate hinged to the shore loading point side of each platform affording a surface connecting each platform with the shore loading point.

5. In combination a moored ship having a plurality of vehicle decks each being provided with a plurality of vehicle lanes which extend from the stern of the ship and which are approximately parallel to the centerline of the ship, a bank of elevators at a shore loading point, said elevators comprising platforms capable of carrying two vehicles side by side and extending to a point in close proximity to a vertical plane through the stern end of the decks of the ship, said elevators being positioned so that each vehicle may be loaded and unloaded by being moved in a straight line and so that the platforms may be placed opposite any deck irrespective of the condition of the tide and a plurality of brow plates individually hinged to the ship side of each platform, and a brow plate hinged to the shore loading point side of each platform.

RICHARD L. BURKE.

No references cited.